United States Patent Office 3,518,054
Patented June 30, 1970

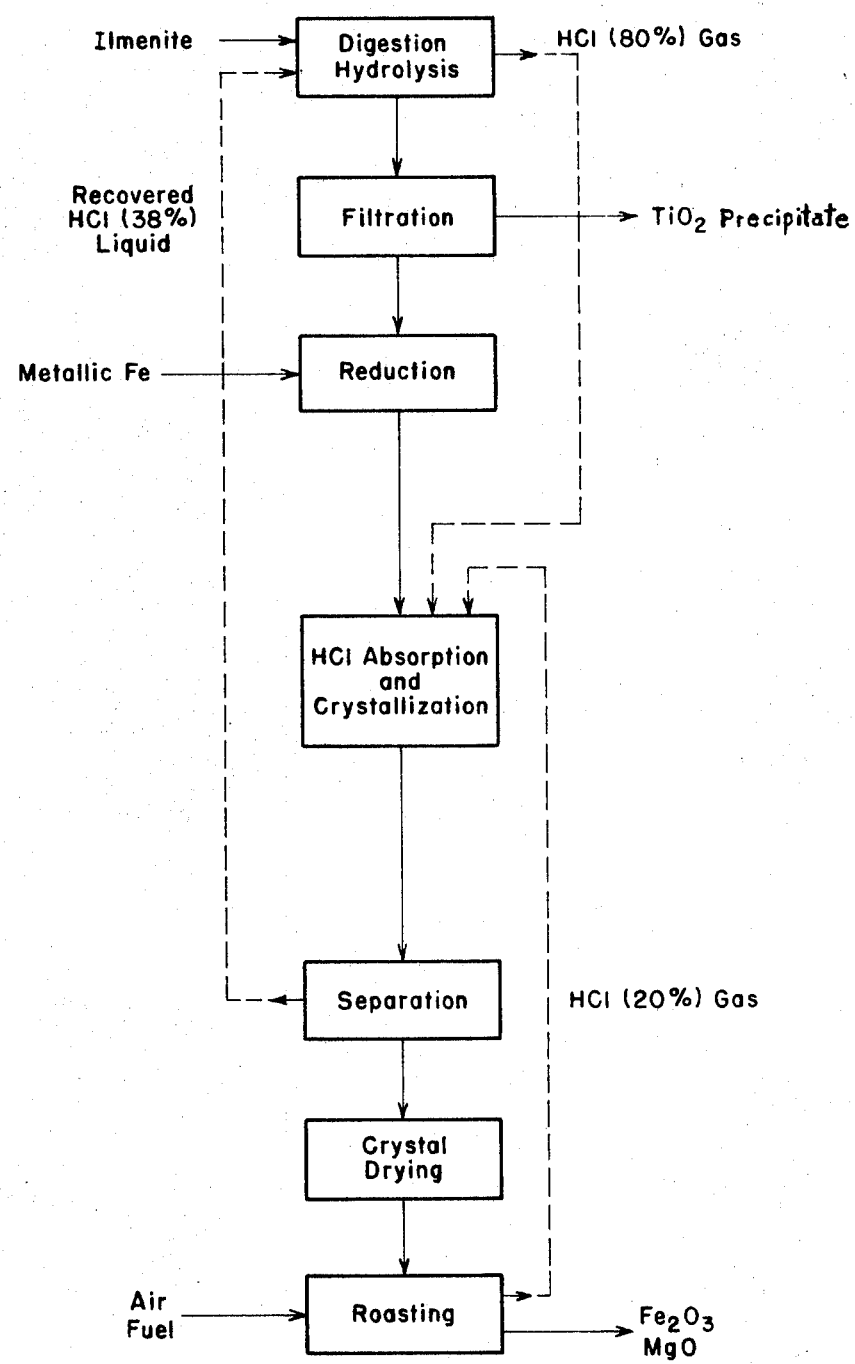

3,518,054
PROCESS FOR THE MANUFACTURE OF A TITANIUM DIOXIDE CONCENTRATE
Achim Kulling, Opladen, and Helmut Steinhausen, Leverkusen, Germany, assignors to Titangesellschaft mbH, Leverkusen, Germany, a corporation of Germany
Continuation-in-part of application Ser. No. 724,827, Apr. 25, 1968. This application Sept. 23, 1968, Ser. No. 761,669
Int. Cl. C01g 23/04
U.S. Cl. 23—202          2 Claims

ABSTRACT OF THE DISCLOSURE

This invention describes a new process for preparing a titanium concentrate in which an ilmenite ore is heated to boiling with concentrated hydrochloric acid to solubilize both the titanium and iron values while allowing about one third of the hydrochloric acid to go off whereby the titanium values are precipitated from the iron chloride-titanium chloride solution to form a titanium concentrate low in iron, and processing the residual iron chloride solution to recover the remaining chloride values for use in digesting additional ore. The titanium concentrate so produced is particularly desirable as chlorination feed material for producing titanium tetrachloride.

CROSS REFERENCE TO RELATED APPLICATION

This application is a continuation-in-part of our application Ser. No. 724,287 filed Apr. 25, 1968, now abandoned.

BACKGROUND OF THE INVENTION

The manufacture of titanium dioxide concentrates from ilmenite by treatment with hydrochloric acid has been known for a long time. The attempt has been made, for example, of selectively dissolving and removing the iron content while titanium dioxide and gangue minerals remain in the residue. The attempt has also been made to dissolve iron and titanium at the same time and to precipitate the titanium subsequently by hydrolysis. Where the procedures were carried out with dilute hydrochloric acid (<30% HCl) they were found to be disadvantageous since the reprocessing of the dilute acid as by-product is very expensive and does not result in an economical cyclic process.

When using concentrated hydrochloric acid the result depends on the treatment temperature. In case the digestion is carried out at temperatures up to about 65° C., the entire ilmenite goes into solution except for the gangue, provided that the duration of treatment was extended sufficiently. In British Pat. No. 409,847 one or two days are required for complete dissolution; according to the German Patent No. 1,170,385 about 5–8 hours are required. In order to obtain dissolution in a reasonable period, the preferable procedure in both patents cited above is to carry out the process countercurrently in several steps.

When the digestion temperature and therefore the digestion rate is increased, a part of the titanium dissolved is precipitated out again by hydrolysis, as described in the British Pat. No. 409,847 unless the process is carried out in closed containers, as stated in the German Pat. No. 1,083,244.

In order to precipitate the titanium values that have gone into solution and thus obtain a concentrate, it is suggested in the British Pat. No. 409,847 to maintain the solution for an extended period at 85–100° C. until it no longer contains any significant amount of titanium. In this procedure reaching the boiling point should be avoided. Under these conditions a separation into a solution containing iron and a residue of titanium dioxide has been obtained.

In a similar way the precipitation of the titanium dioxide dissolved at first is forced according to U.S. Pat. No. 2,914,381. According to this patent ilmenite of a definite grain size distribution is treated for 1–2 days with concentrated hydrochloric acid at temperatures between 85° C. and the boiling point, preferably below the boiling point. After this period the entire iron is in solution while titanium has been precipitated as titanium dioxide in very fine form. Experience has shown that this titanium dioxide can be separated and washed with great difficulty only, owing to its very fine dispersion.

The expenditure of time required by the processes cited is however a great disadvantage for an economical operation.

A more rapid separation is achieved according to the previously cited German Pat. No. 1,170,385. The ilmenite which is completely dissolved at 55–65° C. is, after removal of the undissolved gangue, heated to the boiling point and maintained at this temperature long enough until the hydrogen chloride has been largely removed from the solution which requires an additional 3 hours subsequent to the digestion period of 5 hours. After this time the amount of $TiO_2$ originally present in the ilmenite has been almost completely precipitated while the iron has remained in solution. The disadvantage in this process is that the digestion is very time-consuming and, in addition, must be carried out countercurrently in expensive apparatus and that the entire process for the manufacture of the titanium dioxide concentrate requires at least two steps.

The instant invention avoids these disadvantages and provides an improved process for the manufacture of a titanium dioxide concentrate from ilmenite by treatment with concentrated hydrochloric acid in such a way that digestion and precipitation at elevated temperatures takes place in one step and that this process can be carried out in a relatively short time in comparison with the previously known ones.

SUMMARY OF THE INVENTION

The instant invention covers a process for producing a titanium concentrate low in iron which comprises treating an ilmenite ore with an excess, i.e. from 10% to 50% and preferably from 10% to 25%, of hydrochloric acid having a concentration of 36–38% HCl, heating the digestion mixture, with stirring to boiling within a period of 15–30 minutes, boiling the digestion mixture for 2–3 hours, during the boiling period allowing substantially one third of the HCl to escape from the digestion mixture while at the same time the titanium values having gone into solution with the iron values, precipitate out of the iron chloride-titanium chloride solution. The precipitated titanium values along with residual solids from the iron chloride-titanium chloride solution are removed to give a substantially titanium free iron chloride solution. The iron chloride solution may then be further processed by adding metallic iron thereto, followed by cooling and upon introducing concentrated HCl gas into the cooled solution, the reduced iron chloride values crystallize out of the solution as $FeCl_2 \cdot 4H_2O$ crystals. These iron chloride crystals may be roasted to recover the iron as $Fe_2O_3$ and to release gaseous hydrogen chloride. The HCl release from the roasting operation plus the concentrated HCl released from the digestion mixture may be recycled to increase the HCl concentration of additional iron chloride solution. The filtrate recovered after removal of the iron chloride crystals from the iron chloride solution which has been fortified with the recycled HCl gas will have an HCl concentration of from 36–38% and hence may be recycled for digesting more ilmenite ore.

With reference to the use of excess hydrochloric acid the term "excess" will be understood to denote between 10% and 50% based on the formation of $TiCl_4$ and preferably 10%–25% which corresponds to a molar ratio of Cl to $TiO_2$ of 4.4–5:1.

BRIEF DESCRIPTION OF THE DRAWING

A flow sheet of the process of the instant invention is presented to explain more fully the operation of the process.

Ilmenite ore is digested with a solution containing 36–38% HCl at elevated temperatures during which HCl gas is volatilized and the titanium values are precipitated. The titanium precipitate is removed from the iron chloride solution by filtration. Metallic iron is then added to the iron chloride solution to reduce the ferric iron values to the ferrous state. The ferrous chloride solution is fortified with HCl and $FeCl_2 \cdot 4H_2O$ is crystallized from solution. The $FeCl_2 \cdot 4H_2O$ crystals are then roasted to form $Fe_2O_3$ and HCl gas. This HCl gas plus the HCl released from the digestion step is used to fortify the ferrous chloride solution. After crystallization of the $FeCl_2 \cdot 4H_2O$ the remaining fortified HCl solution is recycled to the digestion tank to react with more ilmenite ore.

DESCRIPTION OF PREFERRED EMBODIMENT

In the instant invention, it was found that in contrast to prior known processes, it is not necessary to dissolve first titanium and iron and then to precipitate titanium in a separate precipitation step but that the dissolving process for iron and titanium and the precipitation of the titanium already dissolved can take place side by side without that both reactions influence each other disadvantageously. This is achieved in such a way that the ore suspension is heated immediately to boiling temperature and that no provisions are made, as had been done previously, for the prevention of the escape of hydrogen chloride gas during the digestion. On the contrary, care is taken that a reduction in the concentration of hydrogen chloride takes place. By lowering the concentration of the hydrogen chloride hydrolysis of the dissolved titanium is accelerated. The addition of a special nuclei solution is not necessary when the instant process is used.

In the treatment of ilmenite with concentrated hydrochloric acid according to the invention, iron and titanium go together into partial solution. Immediately after reaching the boiling point, and before the iron and the titanium values are dissolved quantitatively, the titanium starts to hydrolyze and thus to precipitate. By continuous boiling, almost all of the iron and titanium values go into solution while simultaneously upon lowering the hydrogen chloride content, the titanium values precipitate again almost quantitatively. The time necessary for heating to the boiling point is not critical. It is however expedient to heat the suspension as fast as possible so that the boiling point is reached within the course of 15 to 30 minutes. It is important, on the other hand, that during the boiling period, about one-third of the hydrogen chloride content escapes in the form of gas. Within 2 to 3 hours an end-point is reached concerning the concentration of iron, titanium and chloride ions in the solution. At this point less than 1% of the titanium dioxide originally present in the ilmenite used is still in solution, while the residue together with the hydrolyzate consists of 88–90% $TiO_2$ and contains less than 2% Fe. Besides that almost the entire amount of calcium and magnesium contained in the ilmenite has gone into solution so that the alkaline earth content of the separated and dried residue is below 1% which is very important for the use of the concentrate as raw material for the titanium tetrachloride manufacture by chlorination in the fluidized bed, since a low magnesium content is particularly prerequisite for a smooth operation of this chlorination process.

The fact that the dissolution of ilmenite and the hydrolytic precipitation of the titanium actually take place simultaneously will be shown by way of an experiment in which 291 g. of dry ilmenite with a content of 44.3%–128.9 g. $TiO_2$ and 33.9%–98.6 g. Fe are mixed with 1000 ml. of a hydrochloric acid of 37.7% HCl. The mixture is heated to boiling within 30 minutes and maintained at this temperature for 3 hours. At intervals of a few minutes to one hour samples were taken and their $TiO_2$ and Fe content analytically determined. From the values obtained (which are recorded in the following Table 1) the progression of the digestion and the beginning of the $TiO_2$ precipitation can be easily perceived.

TABLE 1

| Time (min.) | Temperature, °C. | Composition of the solution (g.p.l.) | | |
|---|---|---|---|---|
| | | $TiO_2$ | Fe | Cl |
| 0 | 20 | | | 434 |
| 9 | 50 | 5.0 | 15.6 | 403 |
| 15 | 70 | 24.0 | 24.6 | 396 |
| 21 | 90 | 62.5 | 53.6 | 379 |
| 30 | 106 | 102 | 81.5 | 366 |
| 60 | 108 | 52.5 | 91.6 | 347 |
| 90 | 110 | 14.0 | 97.7 | 327 |
| 150 | 110 | 3.3 | 103 | 311 |
| 210 | 110 | <1 | 106 | 301 |
| Residue, percent | | 88.6 | 1.3 | |

Up to the boiling point the $TiO_2$ content increases to 102 g.p.l., and the Fe content to 81.5 g.p.l. After additional 30 minutes the $TiO_2$ content is only 52.5 g. while the Fe content has increased to 91.6 g. Of the original 434 g. Cl/liter, up to this point 87 g. have been driven out. With increasing duration of treatment the iron content increases further, the chlorine and $TiO_2$ contents, on the other hand, decreased still more.

Owing to the reduced amount of hydrogen chloride in the solution, the volume of the solution decreases, whereby it seems that an increase of all dissolved substances occurs. After a total duration of digestion of 3.5 hours, the reaction came to a standstill.

The residue consisting of hydrolysate, the undissolved portion of the ilmenite and the gangue, is filtered off from the mother liquor and is subsequently washed with 10% hydrochloric acid and water. In contrast to other hydrated titanium dioxides obtained according to known processes, it may be filtered off with great ease and washed rapidly. If, for example, a hydrolysate produced according to the invention by the digestion of 300 g. ilmenite is filtered off from the digestion liquor together with the insoluble portions and washed three times with 500 ml. of about 10% hydrochloric acid in each case, and subsequently three times with 500 ml. water, the filtering rate at a filtering surface of 113 sq. cm. is about 550 ml. per minute. In addition, the filtration rates required are nearly constant during the entire filtration duration, as shown in Table 2.

Table 2

| Washing of the residue: | Time in sec. |
|---|---|
| 1st washing 500 ml. 10% HCl | 58 |
| 2nd washing 500 ml. 10% HCl | 58 |
| 3rd washing 500 ml. 10% HCl | 56 |
| 4th washing 500 ml. $H_2O$ | 53 |
| 5th washing 500 ml. $H_2O$ | 54 |
| 6th washing 500 ml. $H_2O$ | 55 |

Of course the application of such large volumes of liquid is by no means necessary. The intention is solely to prove that the filtering ability is extraordinarily good which must be rated as a decisive advantage of the process according to the invention.

In the processing of the iron chloride solution remaining after separation and removal of the titanium hydrolysate, the dissolved iron (III) is reduced in a known manner preferably by introducing metallic iron, then cooling the solution and subsequently introducing concentrated hydrogen chloride. The iron values as $FeCl_2.4H_2O$, crystallize out and are separated from the solution, dried and then thermally decomposed to recover the iron values as $Fe_2O_3$ and gaseous HCl.

An important feature of the invention is the use of the residual HCl filtrate, recovered after removal of the iron crystals from the iron chloride solution, for digesting additional ore. The absorption of the gaseous HCl obtained by thermal decomposition of the iron chloride in the reduced iron chloride solution would not serve to increase its acid concentration sufficiently to produce a filtrate suitable for digestion purposes. However absorption by the iron chloride solution of the highly concentrated HCl recovered during digestion of the ore serves to increase the acid concentration of the iron chloride solution sufficiently to produce a filtrate of 36–38% HCl concentration which may be recycled for digestion of fresh ilmenite so that the production of the titanium concentrate according to the invention may be carried out as cyclic process. It remains only to make up any losses of hydrochloric acid.

The following examples serve for more detailed explanation of the invention.

EXAMPLE 1

291 g. of dry ilmenite corresponding to an amount of 300 g. moist ore with a content of 44.3% $TiO_2$, 33.9% Fe, 5.3% MgO and 0.3% CaO were suspended in 1000 ml. of 37.7% hydrochloric acid, corresponding to an excess of 23% HCl, in a 2 liter round bottom flask fitted with stirrer and reflux condenser, heated to boiling within 20 minutes and maintained at this temperature. After a total of 3 hours the titatnium hydrolysate and insoluble residue were filtered off from the mother liquor and subsequently washed with about 10% hydrochloric acid and water. The precipitate could be separated and washed readily. In the filtrate of the digestion, less than 1 g. $TiO_2$ could be found corresponding to less than 1% of the originally used titanium dioxide; and 290 g. Cl which corresponds to a loss of 143 g. Cl. The calcined residue consisted of 88.4% $TiO_2$ and contained, in addition, 1.2% Fe besides 0.6% alkaline earth oxides.

The filtrate without washing liquid was worked up as follows: The 860 ml. equal to 1100 g., as obtained, were reduced at 60–70° C. with 20 g. metallic iron. Subsequently the solution was cooled to 20° C. whereby a part of the iron crystallized out as $FeCl_2.4H_2O$. By introducing gaseous HCl totaling 260 g. HCl at temperatures from 20–60° C., the larger part of the iron still dissolved was also precipitated as $FeCl_2.4H_2O$. When separating the iron chloride precipitate 736 ml. equal to 910 g. filtrate were recovered and contained 26.6 g.p.l. $FeCl_2$, 2.0 g.p.l. $FeCl_3$, 0.7 g.p.l. $TiO_2$ and 458 g.p.l. HCl in the form of free HCl. This solution was employed for a further ilmenite digestion. The residue obtained after this digestion contained 1.2% iron. By the renewed use of the digestion solution no increase of the iron content had therefore occurred in the residue.

EXAMPLE 2

300 g. of an ilmenite of an origin other than the one processed in the preceding example with a content of 43.8% $TiO_2$, 36.7% Fe, 3.7% MgO and 0.2% CaO were suspended in 1000 ml. of 38.5% hydrochloric acid and heated to boiling within 29 minutes while stirring. The further treatment was carried out as described in Example 1. The precipitate could also be filtered and washed extremely well. Its content of $TiO_2$ after calcination was 88.0%, the iron content 1.9% and the content of alkali oxides 0.6%. The filtrate contained less than 1 g. $TiO_2$, corresponding to less than 1% of the $TiO_2$ used originally. The filtrate was also processed as described in Example 1 and conveyed to a new digestion.

The advantage of the process according to the invention consists especially in that in one step without application of pressure a titanium dioxide concentrate with a low content of iron and magnesium may be manufactured. It is particularly advantageous in that the reaction according to the instant invention may be carried out in a short period and that it is possible to work with high acid concentrations whereby a high percent hydrochloric acid is recovered which may be employed again for digestion. Furthermore, the good filterability of the precipitated titanium dioxide concentrate is propitious.

The combination of all the advantages cited is obtained by the instant invention which leads to a process possessing great economy.

While this invention has been described and illustrated by the examples shown, it is not intended to be strictly limited thereto, and other variations and modifications may be employed within the scope of the following claims.

What is claimed is:

1. Process for producing a titanium concentrate low in iron and alkaline earth metal oxides which comprises mixing an ilmenite ore with an excess of from 10% to 25% hydrochloric acid, the concentration of said acid being from 36% to 38% HCl, heating the mixture, with stirring, to boiling within a period of from 15 to 30 minutes, boiling the mixture for from 2 to 3 hours thereby solubilizing the titanium and iron values, allowing about one third of the original hydrochloric acid to go off during the digestion reaction whereby the titanium values are precipitated from the iron chloride-titanium chloride solution as hydrous $TiO_2$, filtering said solution to recover said hydrous $TiO_2$ plus any residual solids as a $TiO_2$ concentrate, reducing the iron values in the iron chloride solution to the ferrous state with metallic iron and upon cooling and adding HCl into the solution, crystallizing the iron values as $FeCl_2.4H_2O$, roasting said $FeCl_2.4H_2O$ to form $Fe_2O_3$ and HCl, and recycling the HCl from the roasting operation and the HCl released from the digestion reaction to leach more ilmenite ore.

2. Process for producing a titanium concentrate low in iron and alkaline earth metal oxides which comprises mixing an ilmenite ore with an excess of from 10% to 25% hydrochloric acid, the concentration of said acid being from 36% to 38% HCl, heating the mixture, with stirring, to boiling within a period of from 15 to 30 minutes, boiling the mixture for from 2 to 3 hours thereby solubilizing the titanium and iron values, allowing about one third of the original hydrochloric acid to go off during the digestion reaction whereby the titanium values are precipitated from the iron chloride-titanium chloride solution as hydrous $TiO_2$, filtering said solution to recover said hydrous $TiO_2$ plus any residual solids as a $TiO_2$ concentrate, reducing the iron values in the iron chloride solution to the ferrous state with metallic iron and upon cooling and adding HCl into said solution, crystallizing the iron values as $FeCl_2.4H_2O$, roasting said $FeCl_2.4H_2O$ to form $Fe_2O_3$ and HCl, the HCl released from the digestion reaction and the HCl released from the roasting operation recycled and used as the HCl added to the iron chloride solution, the HCl solution obtained from the $FeCl_2 \cdot H_2O$ crystallization step recycled and used to leach more ilmenite ore.

References Cited

UNITED STATES PATENTS

| | | | |
|---|---|---|---|
| 2,441,856 | 5/1948 | Turner et al. | 23—202 |
| 2,527,257 | 10/1950 | Judd | 23—202 |
| 2,804,375 | 8/1957 | Kamlet | 23—202 |
| 2,914,381 | 11/1959 | Wainer | 23—202 |
| 3,076,692 | 2/1963 | Ruter et al. | 23—202 |
| 3,193,376 | 7/1965 | Lo et al. | 23—202 XR |
| 3,202,524 | 8/1965 | Richmond | 23—202 XR |
| 3,236,596 | 2/1966 | Zirngibl et al. | 23—202 |
| 3,407,033 | 10/1968 | Ruter et al. | 23—87 |

EDWARD STERN, Primary Examiner

U.S. Cl. X.R.

23—87, 154, 200; 75—1